United States Patent
Park et al.

(10) Patent No.: US 10,862,116 B2
(45) Date of Patent: Dec. 8, 2020

(54) POROUS SILICON BASED NEGATIVE ELECTRODE ACTIVE MATERIAL, METHOD FOR MANUFACTURING THE SAME, AND RECHARGEABLE LITHIUM BATTERY INCLUDING THE SAME

(71) Applicants: UNIST (ULSAN NATIONAL INSTITUTE OF SCIENCE AND TECHNOLOGY), Ulsan (KR); SJ MATERIALS CO., LTD, Ulsan (KR)

(72) Inventors: Soojin Park, Ulsan (KR); Sin Ho Choi, Busan (KR); Ji Hyun Yoon, Ulsan (KR); Byoung Man Bang, Gyeongsan-si (KR)

(73) Assignees: UNIST (ULSAN NATIONAL INSTITUTE OF SCIENCE AND TECHNOLOGY), Ulsan (KR); SJ MATERIALS CO., LTD., Ulsan (KR)

( * ) Notice: Subject to any disclaimer, the term of this patent is extended or adjusted under 35 U.S.C. 154(b) by 265 days.

(21) Appl. No.: 15/811,816

(22) Filed: Nov. 14, 2017

(65) Prior Publication Data
US 2018/0069238 A1     Mar. 8, 2018

Related U.S. Application Data

(63) Continuation-in-part of application No. 14/309,945, filed on Jun. 20, 2014, now abandoned.

(30) Foreign Application Priority Data

Jun. 21, 2013     (KR) ...................... 10-2013-0071793

(51) Int. Cl.
*H01M 4/38*     (2006.01)
*H01M 4/86*     (2006.01)
(Continued)

(52) U.S. Cl.
CPC ........... *H01M 4/386* (2013.01); *C01B 33/023* (2013.01); *H01M 4/0471* (2013.01); *H01M 4/13* (2013.01);
(Continued)

(58) Field of Classification Search
CPC ........ H01M 4/36; H01M 4/386; H01M 4/364; H01M 4/13; H01M 4/0471; H01M 4/366;
(Continued)

(56) References Cited

U.S. PATENT DOCUMENTS

2005/0042128 A1*  2/2005  Matsubara ............. C22C 28/00
                                                             419/66
2009/0092899 A1*  4/2009  Treger .................. C01B 33/023
                                                             429/188
(Continued)

FOREIGN PATENT DOCUMENTS

CN      102208636     *  5/2011   ............. H01M 4/38
WO   WO 2012/126338  *  9/2012   ............. H01M 4/36

OTHER PUBLICATIONS

English Translation of CN102208636.*

*Primary Examiner* — Milton I Cano
*Assistant Examiner* — Kiran Akhtar
(74) *Attorney, Agent, or Firm* — Lex IP Meister, PLLC

(57) ABSTRACT

The present invention relates to a method of preparing a porous silicon-based negative electrode active material comprising: mixing a porous silica ($SiO_2$) and an aluminum powder; oxidizing all or part of the aluminum powder as an aluminum oxide while at the same time reducing all or part of the porous silica as a porous silicon (Si) by heat-treating a mixture of the porous silica with the aluminum powder, a negative electrode active material, and a rechargeable lithium battery including the same.

21 Claims, 11 Drawing Sheets

(51) Int. Cl.
*H01M 10/0525* (2010.01)
*H01M 4/04* (2006.01)
*H01M 4/36* (2006.01)
*C01B 33/023* (2006.01)
*H01M 4/13* (2010.01)
*H01M 4/62* (2006.01)

(52) U.S. Cl.
CPC ........... *H01M 4/364* (2013.01); *H01M 4/366* (2013.01); *H01M 4/8605* (2013.01); *H01M 10/0525* (2013.01); *H01M 4/0402* (2013.01); *H01M 4/36* (2013.01); *H01M 4/38* (2013.01); *H01M 4/625* (2013.01); *H01M 2004/8684* (2013.01)

(58) Field of Classification Search
CPC .. H01M 4/8605; H01M 4/625; H01M 4/0402; H01M 2004/8684; H01M 10/0525; H01M 4/38; C01B 33/023
See application file for complete search history.

(56) References Cited

U.S. PATENT DOCUMENTS

| | | | | |
|---|---|---|---|---|
| 2010/0055563 A1* | 3/2010 | Nakanishi | ............ | H01M 4/364 |
| | | | | 429/209 |
| 2012/0171571 A1* | 7/2012 | Kurakane | ............. | H01M 4/133 |
| | | | | 429/224 |
| 2014/0147751 A1* | 5/2014 | Yang | .................... | H01M 4/133 |
| | | | | 429/231.8 |

* cited by examiner

POROUS SILICON BASED NEGATIVE ELECTRODE ACTIVE MATERIAL, METHOD FOR MANUFACTURING THE SAME, AND RECHARGEABLE LITHIUM BATTERY INCLUDING THE SAME

CROSS-REFERENCE TO RELATED APPLICATION

This application is a Continuation Application of U.S. patent application Ser. No. 14/309,945 filed on Jun. 20, 2014, which claims priority to and the benefit of Korean Patent Application No. 10-2013-0071793 filed in the Korean Intellectual Property Office on Jun. 21, 2013, the entire contents of which are incorporated herein by reference.

FIELD OF THE INVENTION

A porous silicon-based negative electrode active material, a method of manufacturing the same, and a rechargeable lithium battery including the same are disclosed.

BACKGROUND OF THE INVENTION

A rechargeable lithium battery, as a power supply of electronic devices, is in the spotlight. Graphite is widely used as a material of rechargeable lithium battery, but high capacity of rechargeable lithium battery is not easily achieved because capacity per a gram in graphite is small, 372 mAh/g.

As a negative electrode material indicating a higher capacity than that of graphite, there is a material forming an intermetallic compound with lithium such as silicon, tin, oxide thereof, etc.

However, those materials have a problem which increases volume by causing to change crystalline when they absorb and store lithium. In case of silicone, when absorbing and storing lithium at most, it transforms to $Li_{4.4}Si$ and then its volume is increased by charge. The increasing rate of the volume is about 4.12 times higher than volume of silicon before it expanded. For reference, a rate of volume expansion of graphite used as a material of a negative electrode at present is about 1.2 times.

Therefore, lots of research for high capacity of negative electrode active material such as silicon, particularly, research for reducing a rate of volume expansion by alloying with silicon are being done. However, its realization has a problem because when a metal such as Si, Sn, and Al is alloyed with lithium at the time of charging and discharging, expansion and contraction in the volume is made, and thereby metal atomization is achieved as well as cycle characteristic is declined.

Although silicon is the best candidate atom for achieving high capacity, it and its alloy are traditionally known that they are not easily amorphized.

Another problem of silicon-based negative electrode active material is that the brittle of crystalline is high. In case of high brittle of crystalline, cracks in negative electrode active materials of the electrode occur rapidly at the repeated process of intercalation and de-intercalation with lithium. Thereby life cycle of the battery suddenly is reduced.

CONTENT OF THE INVENTION

Problem in Trying to Solve

The following disclosure relates to a porous silicon-based negative electrode active material, which restrains the volume expansion of active material along life cycle, and the stability as well as life cycle is improved, a method for preparing the same, and a rechargeable lithuim battery including the same.

Means of Solving a Problem

An exemplary embodiment of the present invention provides a method for preparing a porous silicon-based negative electrode active material, comprising: mixing porous silica ($SiO_2$) with aluminum powder; oxidizing all or part of the aluminum powder as an aluminum oxide while at the same time reducing all or part of the porous silica as a porous silicon (Si) by heat-treating a mixture of the porous silica with the aluminum powder.

The porous silica may be obtained from diatomite.

Average particle diameter of the porous silica may be 100 nm to 50 μm.

Average particle diameter of porosity of the porous silica may be 20 nm to 1 μm.

Average particle diameter of the aluminum powder may be 1 μm to 100 μm.

25 to 70 parts by weight of the aluminum powder is added to 100 parts by weight of the porous silica in the step of mixing the porous silica with aluminum powder.

The step of mixing the porous silica with the aluminum powder is to add mineral additives to the porous silica and the aluminum powder.

The mineral additive may be sodium chloride (NaCl), potassium chloride (KCl), calcium chloride ($CaCl_2$), magnesium chloride ($MgCl_2$) or a combination thereof.

The step of mixing the porous silica with the aluminum powder may be performed by a method of dry mixing.

The heating process may be performed at temperature of 650° C. to 950° C. under the step of heat-treating a mixture of the porous silica and aluminum powder.

Weight of the aluminum oxide may be 1 to 20 parts by weight based on 100 parts by weight of the porous silicon at the obtained porous silicon-based negative electrode active material.

The obtained porous silicon-based negative active material may be a shape where the porous silicon is evenly mixed with the aluminum oxide.

The method may include the step of removing all or part of the aluminum oxide which is produced after heat-treating a mixture of the porous silica and the aluminum powder.

The step of removing all or part of the aluminum oxide may be performed to use sodium chloride, phosphoric acid, hydrofluoric acid, sulfuric acid, nitric acid, acetic acid, ammonia solution, hydrogen peroxide, or a combination thereof.

The method may further include a carbon coating step after a step of heat-treating the mixture of porous silica and aluminum powder.

Another exemplary embodiment of the present invention provides a method for preparing a porous silicon-based negative electrode active material, comprising: mixing a porous silica ($SiO_2$) and a first metal powder; oxidizing all or part of the first metal powder as a first metal oxide. while at the same time reducing a part of the porous silica as a porous silicon (Si) by heat-treating a mixture of the porous silica with the first metal power; obtaining a first porous silicon-based material including the porous silicon and the first metal oxide; mixing the first metal powder, a second metal powder of different kinds, and the obtained first porous silicon-based material; oxidizing all or part of the first metal powder as a second metal oxide while at the same time reducing a remaining porous silica as a porous silicon by heat-treating a mixture of the second metal powder with the first porous silicon-based material; and obtaining a second porous silicon-based material including the porous silicon, the first metal oxide, and the second metal oxide.

The porous silica may be obtained from diatomite.

Average particle diameter of the porous silica may be 100 nm to 50 μm.

Average particle diameter of porosity of the porous silica may be 20 nm to 1 μm.

The first metal powder is different from the second metal powder, and each of them may be independently aluminum, magnesium, calcium, aluminum silicide ($AlSi_2$), magnesium silicide ($Mg_2Si$), calcium silicide ($Ca_2Si$), or a combination thereof.

Either the first metal powder or the second metal powder may be aluminum.

Each average particle diameter of the first metal powder and the second metal powder may be independently 1 μm to 100 μm.

25 to 70 parts by weight of the first metal powder may be added to 100 parts by weight of the porous silica.

50 to 80 parts by weight of the second metal powder may be added to 100 parts by weight of the first porous silicon-based material.

The step of mixing the porous silica with the first metal powder may be to add mineral additives.

The step of mixing the first porous silcon-based material with the second metal powder may be to add mineral additives.

The mineral additive may be sodium chloride (NaCl), potassium chloride (KCl), calcium chloride ($CaCl_2$), magnesium chloride ($MgCl_2$) or a combination thereof.

The step of mixing the porous silica with the first metal powder may be performed by a method of dry mixing.

The step of mixing the first porous silicon-based material with the second metal powder may be performed by a method of dry mixing.

In the heat-treating a mixture of the porous silica and the first metal powder, the heat-treating may be performed at a temperature of 650° C. to 950° C.

In the heat-treating a mixture of the second metal powder and the first porous silicon-based material, the heat-treating may be performed at a temperature of 650° C. to 950° C. The first metal oxide and the second metal oxide are different from each other, and each, independently, may be MgO, CaO, $Al_2O_3$, $TiO_2$, $Fe_2O_3$, $Fe_3O_4$, $Co_3O_4$, NiO, $SiO_2$ or a combination thereof.

In the second porous silicon-based material, each of the content of the first metal oxide and the content of the second metal oxide independently may be 1 to 20 weight parts against 100 weight parts of the porous silicon.

The obtained second porous silicon-based material may be a shape where the porous silicon is evenly mixed with the first metal oxide and the second metal oxide.

The obtained second porous silicon-based material may include alloy of the first metal oxide and the second metal oxide.

The method stated before may further include the step of removing all or part of the first metal oxide after heat-treating the mixture of the porous silica and the first metal powder.

The step of removing all or part of the first metal oxide may be performed to use sodium chloride, phosphoric acid, hydrofluoric acid, sulfuric acid, nitric acid, acetic acid, ammonia solution, hydrogen peroxide, or a combination thereof.

The method may further include the step of removing all or part of the second metal oxide after heating the mix of the first porous silicon-based material and the second metal powder.

The step of removing all or part of the second metal oxide may be performed to use sodium chloride, phosphoric acid, hydrofluoric acid, sulfuric acid, nitric acid, acetic acid, ammonia solution, hydrogen peroxide, or a combination thereof.

The method may further include a carbon coating step after the step of obtaining the second porous silicon-based material.

Another embodiment of the present invention provides a porous silicon-based negative electrode active material including a porous silicon and an aluminum oxide, in which the porous silicon is evenly mixed with the aluminum oxide.

The negative electrode active material may further include a porous silica, an aluminum powder, or a combination thereof.

Average particle diameter of the porous silicon may be 100 nm to 50 μm.

Average particle diameter of the aluminum oxide may be 1 μm to 100 μm.

Weight of the aluminum oxide may be 1 to 20 parts by weight based on 100 parts by weight of the porous silicon.

The negative electrode active material may further include MgO, CaO, $TiO_2$, $Fe_2O_3$, $Fe_3O_4$, $Co_3O_4$, NiO, $SiO_2$, or a metal oxide from a combination thereof.

Weight of the metal oxide may be 1 to 20 parts by weight based on 100 parts by weight of the porous silicon.

The negative electrode active material may include alloy of an additional metal oxide and the aluminum oxide.

The negative electrode active material may include a core including the porous silicon and the aluminum oxide as well as a carbon layer coated on the core.

Another embodiment of the present invention provides a rechargeable lithium battery comprising a negative electrode including a negative electrode active material prepared by a method stated before and a positive electrode.

Another embodiment of the present invention provides a rechargeable lithium battery comprising a negative electrode including a negative electrode active material and a positive electrode.

The Effect of the Invention

A rechargeable lithium battery is provided by the method for a silicon-based negative electrode active material described at the embodiment of the present invention, which improves life cycle by reducing volume expansion of a silicon when charged or discharged.

DETAILED DESCRIPTION OF THE EMBODIMENTS

Figure 1:
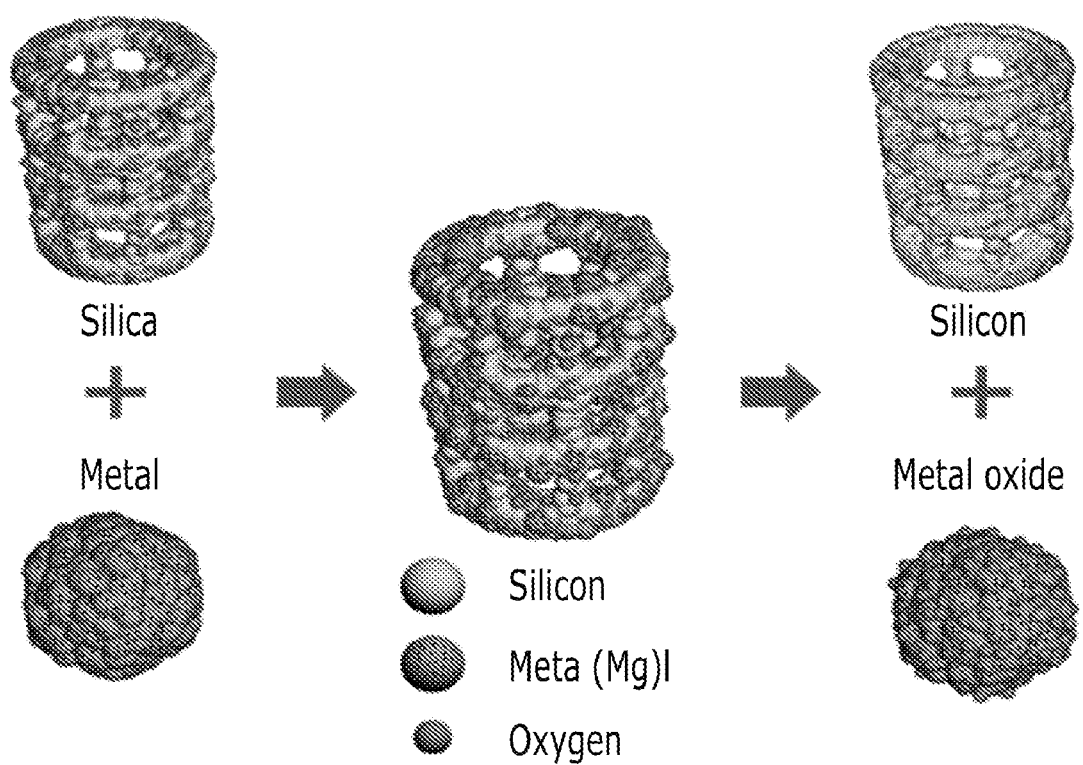
FIG. 1 is an overview of the method for preparing a negative electrode active material described at an embodiment of the present invention.

Hereinafter, embodiments of the present invention will be described in detail. However, the embodiments are described for illustrative purpose, and the present invention is not limited thereto. Therefore, the present invention will be defined by the scope of the appended claims to be described below.

Each meaning of particle size, particle diameter, major axis, grain size, equivalent diameter is the same as long as this specification does not define each of them separately. Hereinafter, major axis defines the longest line of connected lines between two points, and closed curve defines a curve which a point on the curve moves to a particular direction and then come back to starting point.

Average particle diameter at the present invention is calculated as arithmetic average of particle diameter which is calculated after measuring particle diameter of a cross section of a sample by scanning electron microscope (SEM).

A rechargeable lithium battery is classified as lithium ion battery (hereinafter, "rechargeable lithium battery"), lithium ion polymer battery and lithium polymer battery under a type of separator and electrolyte. Moreover, the lithium battery may have a cylindrical shape, a square shape, a coin shape, a pouch shape, or the like, and it may be a bulk type or a thin film type according to the size. Since the structure of the battery and the method for preparing the same are well known in the art, the detailed description thereof will be omitted.

Generally, a rechargeable lithium battery is built in a battery vessel with a spiral phase which is winded after stacking up a negative electrode, a positive electrode and then a separator step-by-step.

The negative electrode includes a collector and a negative electrode active material layer on the collector. The negative electrode active material layer includes a negative electrode active material.

The negative electrode active material includes a material which is reversibly intercalated or de-intercalated, lithium, alloy of lithium, a material which is capable of doping and dedoping to lithium, or a transition metal oxide.

The material which is reversibly capable of intercalating and de-intercalating is carbon. Generally, any carbon-based negative electrode active material can be used, and as a typical example, crystalline carbon, amorphous carbon, or a combination thereof. Examples of the crystalline carbon are shapeless, plate-shaped, flake-shaped, globular shape, or fibrous natural or artificial graphite. Examples of the amorphous carbon are soft carbon, hard carbon, mesophase pitch carbide, or calcined cokes.

The alloy of lithium metal may be used an alloy of lithium and a metal selected from the group consisting of Na, K, Rb, Cs, Fr, Be, Mg, Ca, Sr, Si, Sb, Pb, In, Zn, Ba, Ra, Ge, Al and Sn.

The materials which is capable of doping and dedoping to lithium are Si, $SiO_x$ ($0<x<2$), Si-Q alloy (the Q is a element selected from the group consisting of alkali metal, alkali earth metal, 13 group elements of the periodic table, 14 group elements of the periodic table, transition metal, rare-earth elements, and a combination thereof. Not Si), Sn, $SnO_2$, Sn—R (the R is a element selected from the group consisting of alkali metal, alkali earth metal, 13 group elements of the periodic table, 14 group elements of the periodic table, transition metal, rare-earth elements, and a combination thereof. Not Sn), or a combination of $SiO_2$ and at least one of them. The elements of Q and R can be a element selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof. Also, a combination of $SiO_2$ and at least one of them can be used. Examples of the transition metal oxide are vanadium oxide, lithium-vanadium oxides, etc.

Also, a carbon material is one of the best crystalline carbons, which is fabricated through carbonizing step and graphitization step from a mesophase globular particle. A graphite fiber is another one of the best crystalline carbons, which is fabricated through carbonizing step and graphitization step from mesophase pitch fiber.

An exemplary embodiment of the present invention provides a method for preparing the silicon-based negative electrode active material among the negative electrode active materials.

For more specific, an exemplary embodiment of the present invention provides a method for preparing a porous silicon-based negative electrode active material, comprising: mixing a porous silica ($SiO_2$) with aluminum powder; oxidizing all or part of the aluminum powder to an aluminum oxide as soon as reducing all or part of the porous silica to a porous silicon (Si) by heat-treating a mixture of the porous silica with the aluminum powder.

The obtained negative electrode active material may include the porous silicon and the aluminum oxide. Also, the obtained negative electrode active material may further include remaining porous silica, aluminum powder, or a combination thereof.

Particularly, the obtained negative electrode active material may be a shape where the porous silicon is evenly mixed with the aluminum as well as the aluminum oxide exists on the surface of the porous silicon.

Generally, a silicon-based negative electrode active material is eaily brittle when a battery is charged and discharged. However, the silicon-based negative electrode active material, which is fabricated by the method described at the exemplary embodiment of the present invention, can reduce the volume expansion of the silicon when the battery is charged and discharged.

Also, a reasonable quantity of aluminum oxide can act as a buttress which supports to silicon structure and thus reduce de-intercalation of an electrode plate material. Thereby, a cycle characteristic of battery can be improved.

The porous silica may be obtained from diatomite. The diatomite is composed of precipitated single-cells called to diatom. The diatomite consists of lots of porosity, and the major component is silica.

Average particle diameter of the porous silica may be 100 nm to 50 μm. To be more specific, the diameter may be 100 nm to 40 μm, 100 nm to 30 μm, 100 nm to 20 μm, 100 nm to 10 μm, 100 nm to 5 μm, or 500 nm to 50 μm. When average particle diameter of the porous silica is within the scope stated before, a rechargeable lithium battery can express excellent characteristics of charge-discharge and life cycle.

Average particle diameter of porosity of the porous silica may be 20 nm to 1 μm. To be more specific, the diameter may be 20 nm to 500 nm, 20 nm to 100 nm, 20 nm to 80 nm. At this case, volume expansion of the porous silica resulted from its cycle can be reduced, and thereby the life cycle characteristic of battery can be improved.

Average particle diameter of the aluminum powder may be 1 μm to 100 μm. To be more specific, the diameter can be 1 μm to 90 μm, 1 μm to 80 μm, 1 μm to 70 μm, 1 μm to 60 μm, 1 μm to 50 μm, 1 μm to 40 μm, and 1 μm to 30 μm. When average particle diameter of the aluminum powder, it can act as a buttress which supports to silicon structure and thus reduce de-intercalation of an electrode plate material.

25 to 70 parts by weight of the aluminum powder is added to 100 parts by weight of the porous silica at the step of mixing the porous silica with the aluminum powder. At this case, the characteristic of charge-discharge of battery and the life cycle of the battery can be improved.

The step of mixing porous silica with aluminum powder is to add mineral additives to the mix of the porous silica and the aluminum powder. The additive is a heat dispesant, and can be ionized mineral complex.

The mineral additive disperses heat which rapidly comes out from the interface between the porous silica and the aluminum powder. Thereby, it prevents structure collapse and explosion resulted from partial reactions at the reaction between the porous silica and the aluminum powder. Also, it makes the reaction between the porous silica and the aluminum powder effective, and thereby oxidation-reduction reaction is increased. Consequently, production yield is increased.

The mineral additives may be sodium chloride (NaCl), potassium chloride (KCl), calcium chloride ($CaCl_2$), magnesium chloride ($MgCl_2$) or a combination thereof.

The step of mixing the porous silica with the aluminum powder may be performed by dry mixing or wet mixing containing hydrophilic polymers.

The heat-treating may be performed at temperature of 650° C. to 950° C. at the step of heat-treating the mix of the porous silica and the aluminum powder. For more specific, it may be performed at temperature of 750° C. to 950° C.

The method further includes the step of removing all or part of the aluminum oxide which is performed after heat-treating the mix of the porous silica and the aluminum powder. Moreover, the method is performed by fabricating a negative electrode active material consisting of a pure porous silicon and appropriate ratio of aluminum oxides.

The step of removing all or part of the aluminum oxide may be performed to use sodium chloride, phosphoric acid, hydrofluoric acid, sulfuric acid, nitric acid, acetic acid, ammonia solution, hydrogen peroxide, or a combination thereof.

Weight of the aluminum oxide may be 0 to 20 parts by weight based on 100 parts by weight of the porous silicon at the final obtained porous silicon-based negative electrode active material. To be more specific, it may be 1 to 20 parts by weight, 1 to 15 parts by weight, 1 to 10 parts by weight, and 5 to 10 parts by weight.

Additionally, the method may further include a carbon coating step after a step of heat-treating the mix of the porous silica and the aluminum powder. At this case, electrical conductivity of the negative electrode active material is increased and thus battery characteristic is improved.

The method for preparing the negative electrode active material may be repeated 1 to 2, 3, or more times.

An exemplary embodiment of the present invention provides a method for preparing a porous silicon-based negative electrode active material, comprising: mixing a porous silica ($SiO_2$) with a first metal powder; oxidizing all or part of the first metal powder to a first metal oxide as soon as reducing the part of the porous silica to a porous silicon (Si) by heat-treating a mixture of the porous silica with the first metal powder; obtaining a first porous silicon-based material including the porous silicon and the first metal oxide; mixing the obtained first porous silicon-based material with the second metal powder which is different from the first metal powder; oxidizing all or part of the second metal powder to a second metal oxide as soon as reducing remaining silica to porous silicon by heat-treating the mix of the first porous silicon-based material and the second metal powder; obtaining a second porous silicon-based material including the porous silicon, the first metal oxide, and the second metal oxide.

Generally, a silicon-based negative electrode active material is brittle because of volume expansion of silicon. However, the silicon-based negative electrode active material, which is fabricated by the method, can reduce the volume expansion of the silicon when the battery is charged and discharged. Also, a reasonable quantity of metal oxides can act as a buttress which supports to silicon structure and thus reduce de-intercalation of an electrode plate material. Thereby, a cycle characteristic of battery can be improved.

The method stated above can prepare a silicon-based negative electrode active material with better production yield and simpler processes than a top-down type of silicon surface ething method or a bottom-up type of silicon growth method. Also, the silicon-based negative electrode active material prepared by the method has better control of porosity and uniformity than existing method.

Process for obtaining a first porous silicon-based material is described first at the method.

The first porous silicon-based material may further include a porous silica, a first metal powder, or a combination thereof.

Namely, the obtained first porous silicon-based material may be: a combination of a porous silicon and a first metal oxide; a combination of a porous silica, a porous silicon, and a first metal oxide; a combination of a porous silicon, a first metal powder, and a first metal oxide; or a combination of a porous silica, a porous silicon, a first metal powder, and a first metal oxide.

When the porous silicon-based material includes the porous silicon and the first metal oxide, the first metal oxide may be a shape where it is evenly mixed with the silicon structure as well as the metal oxide exists on the surface of the porous silicon structure.

The method for preparing negative electrode active material is performed by a oxidation-reduction reaction of a porous silica and metal powder. The method is described briefly at FIG. 1.

For example, the reduction reaction of silica is same as reaction 1 and reaction 2. An example of metal powder is aluminum or magnesium.

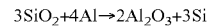  [Reaction 1]

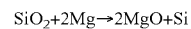  [Reaction 2]

As the reactions are described above, a porous silicon can be produced by oxidation reaction which makes magnesium oxidized as well as makes aluminum oxidized, simultaneously silica is reduced to silicon.

Products from the reactions are the status of mix of porous silicon and aluminum oxide, or the status of porous silicon and magnesium oxide.

The porous silica may be obtained from diatomite. The diatomite is composed of precipitated single-cells called to diatom. The diatomite consists of lots of porosity, and the major component is silica.

Average particle diameter of the porous silica may be 100 nm to 50 μm. To be more specific, the diameter may be 100 nm to 40 μm, 100 nm to 30 μm, 100 nm to 20 μm, 100 nm to 10 μm, 100 nm to 5 μm, or 500 nm to 50 μm. When average particle diameter of the porous silica is within the scope, the rechargeable lithium battery can express excellent trait of charge-discharge and exceptional life cycle.

Average particle diameter of porosity of the porous silica may be 20 nm to 1 μm. To be more specific, the diameter may be 20 nm to 500 nm, 20 nm to 100 nm, 20 nm to 80 nm. At this case, volume expansion of the porous silica can be reduced, and thereby the life cycle of the battery can be improved.

The first metal powder may be used limitlessly when it is possible that oxidation-reduction between the metal powder and the porous silica. To be more specific, the first metal powder may be aluminum metal, magnesium metal, calcium metal, aluminum silicide ($AlSi_2$), magnesium silicide ($Mg_2Si$), calcium silicide ($Ca_2Si$), or a combination thereof.

Average particle diameter of the first metal powder may be 1 μm to 100 μm. To be more specific, the diameter may be 1 μm to 90 μm, 1 μm to 80 μm, 1 μm to 70 μm, 1 μm to 60 μm, 1 μm to 50 μm, 1 μm to 40 μm, and 1 μm to 30 μm. When average particle diameter of the first metal powder, it can act as a buttress which supports to silicon structure and thus reduce de-intercalation of an electrode plate material.

The first metal oxide, to which the first metal powder is oxidized, may be MgO, CaO, $Al_2O_3$, $TiO_2$, $Fe_2O_3$, $Fe_3O_4$, $Co_3O_4$, NiO, $SiO_2$, or a combination thereof.

25 to 70 parts by weight of the first metal powder may be added to 100 parts by weight of the porous silica at the step of mixing the porous silica with the first metal powder. At this case, the characteristic of charge-discharge of a battery and the life cycle of the battery can be improved.

The step of mixing porous silica with the first metal powder may be to add mineral additives to the mix of the porous silica and the first metal powder. The additive is a heat dispesant, and may be ionized mineral complex.

The mineral additive disperses heat which rapidly comes out from the interface between the porous silica and the first metal powder. Thereby, it prevents structure collapse and explosion by partial reactions at the reaction between the porous silica and the first metal powder. Also, it makes the reaction between the porous silica and the first metal powder effective, and thereby oxidation-reduction reaction is increased. Consequently, production yield is increased.

The mineral additives may be sodium chloride (NaCl), potassium chloride (KCl), calcium chloride ($CaCl_2$), magnesium chloride ($MgCl_2$) or a combination thereof but it is not limited thereto.

The step of mixing the porous silica with the first metal powder is performed by dry mixing or wet mixing containing hydrophilic polymers.

The heat-treating is performed in temperature of 650° C. to 950° C. at the step of heat-treating the mix of the porous silica and the first metal powder.

However, the temperature may depend on each metal which is used. For example, the heat-treating may be made at higher temperature than the metal melting temperature. That is, aluminum powder is 750 to 950° C., and magnesium powder is 700 to 750° C.

Meanwhile, the method may further include the step of removing all or part of the first metal oxide after heat-treating the mix of the porous silica and the first metal powder.

In other words, next to the heat-treating, a negative electrode active material may be prepared, which consists of pure porous silicon and suitable ratio of metal oxides after removing the first metal oxide, the first metal powder, byproducts from additional reactions, or a combination thereof.

The step of removing all or part of the first metal oxide may be performed to put mixture of the porous silicon and the first metal oxide into hydrofluoric acid, phosphoric acid, hydrofluoric acid, ammonia solution, hydrogen peroxide, or a combination thereof, and then mix them.

For example, the first method is performed through progressing the stir of hydrochloric acid (HCl) with concentration of 1 M to 11.6 M at temperature of 25 to 130° C.

The second method is performed through progressing the stir of phosphoric acid ($H_3PO_4$) with concentration of 3.5 M to 7.14 M at temperature of 25 to 130° C. The third method is performed through progressing the stir of hydrogen fluoride (HF) with concentration of 1.73 M to 5.75 M at temperature of 25 to 50° C.

The fourth method is performed through progressing the stir of 7.53 M ammonium hydroxide ($NH_4OH$) and 9.79 M hydrogen peroxide at temperature of 25 to 130° C.

The method is performed by itself or a combination thereof. Silicon powder is obtained by vacuum filtration after removing metal oxide, metal powder, or a combination thereof.

At this case, the silicon is obtained, which has a type of porosity of the existing silica.

Weight of the first metal oxide may be 0 to 20 parts by weight based on 100 parts by weight of the porous silicon at the final obtained porous silicon-based material. To be more specific, it may be 1 to 20 parts by weight, 1 to 15 parts by weight, 1 to 10 parts by weight, and 5 to 15 parts by weight. At this case, the rechargeable lithium battery including the negative electrode active material can express excellent characteristics of charge-discharge and life cycle.

Meanwhile, the method for preparing the negative electrode active material may be repeated 1 to 2, 3 times. At this time, the kind of a metal powder may be crossed. Type of the metal oxide, which exists additionally at the final products, is not limited thereto.

To be more specific, the method for preparing the negative electrode active material, after a step of obtaining the first porous silicon-based material may further include: mixing the obtained first porous silicon-based material with the first metal powder and a second metal powder which is different from the first metal powder; oxidizing all or part of the second metal powder to a second metal oxide as soon as reducing remaining silica to porous silicon by heat-treating the mix of the first porous silicon-based material and the second metal powder; and obtaining a second porous silicon-based material including the porous silicon, the first metal oxide and the second metal oxide.

The obtained porous silicon-based material may further include the porous silica, a first metal powder, a second metal powder, or a combination thereof.

The second metal powder, which is different from the first metal powder, is aluminum metal, magnesium metal, calcium metal, aluminum silicide ($AlSi_2$), magnesium silicide ($Mg_2Si$), calcium silicide ($Ca_2Si$), or a combination thereof.

Particularly, either a first metal powder or the second metal powder may be aluminum. At this case, the negative electrode can effectively reduce volume expansion of the active material, as a buttress.

50 to 80 parts by weight of the second metal powder may be added to 100 parts by weight of the first porous silicon-based material. At this case, the characteristic of charge-discharge of a battery and the life cycle of the battery can be improved.

The step of mixing porous silica with the second metal powder may further add mineral additives to the mix of the porous silica and the second metal powder. Description of the mineral additives is the same as description mentioned above.

The step of mixing the porous silica with the second metal powder may be performed by dry mixing or wet mix mixing containing hydrophilic polymers.

The heat-treating may be performed in temperature of 650° C. to 800° C. at the step of heat-treating the mix of the first porous silicon-based material and the second metal powder. However, the temperature may depend on each metal which is used. For example, the heat-treating can be made at a bit higher temperature than the metal melting temperature. Aluminum powder may be at 750 to 950° C., and magnesium powder may be at 700 to 750° C.

The second metal oxide, to which the second metal powder is oxidized, may be, for example, MgO, CaO, $Al_2O_3$, $TiO_2$, $Fe_2O_3$, $Fe_3O_4$, $Co_3O_4$, NiO, $SiO_2$, or a combination thereof. Either the first metal oxide or the second metal oxide may be aluminum oxide.

The obtained second porous silicon-based material may be a shape where the porous silicon is evenly mixed with the first metal oxide and the second metal oxide.

The obtained second porous silicon-based material may include alloy of the first metal oxide and the second metal oxide.

Meanwhile, the method may further include the step of removing all or part of the second metal oxide after heat-treating the mix of the first porous silicon-based material and the second metal powder. Moreover, the method may be performed by fabricating a negative electrode active material consisting of a pure porous silicon and appropriate ratio of metal oxides.

The detailed description of a step of removing all or part of the second metal oxide will be omitted because it is the same as the description at the method of removing the first metal oxide.

Weight of the second metal oxide may be 1 to 20 parts by weight based on 100 parts by weight of the porous silicon at the final obtained negative electrode active material. At this case, the rechargeable lithium battery including the negative electrode active material can express excellent trait of charge-discharge and exceptional life cycle.

Additionally, the method may further include a step of carbon coating on the porous silicon-based material after a step of obtaining the first porous silicon-based material. At this case, electrical conductivity of the negative electrode active material is increased and thus battery trait is improved.

Another exemplary embodiment of the present invention provides a porous silicon-based negative electrode active material produced by the method.

Another embodiment of the present invention provides a method for preparing a porous silicon-based negative electrode active material including a porous silicon and an aluminum oxide, in which the porous silicon is evenly mixed with the aluminum oxide.

The negative electrode active material may further include a porous silica, aluminum powder, or a combination thereof.

Descriptions of the porous silicon and the aluminum oxide are the same the above-mentioned descriptions.

Weight of the aluminum oxide may be 1 to 20 parts by weight based on 100 parts by weight of the porous silicon.

The negative electrode active material may further include MgO, CaO, $TiO_2$, $Fe_2O_3$, $Fe_3O_4$, $Co_3O_4$, NiO, $SiO_2$, or a metal oxide from a combination thereof.

Weight of the metal oxide may be 1 to 20 parts by weight based on 100 parts by weight of the porous silicon.

The negative electrode active material may includes alloy of an additional metal oxide and the aluminum oxide.

Also, the negative electrode active material may further include magnesium metal, calcium metal, aluminum silicide ($AlSi_2$), magnesium silicide ($Mg_2Si$), calcium silicide ($Ca_2Si$), or a combination thereof.

The negative electrode active material may include a core which consists of the porous silicon and the aluminum oxide as well as a carbon layer coated on the core.

Another embodiment of the present invention provides a negative electrode including the negative electrode active material. The negative electrode includes a collector and a negative electrode active material layer on the collector. The negative electrode active material layer includes a negative electrode active material.

Description of the negative electrode active material will be omitted because it is the same as the description mentioned before.

The layer of the negative electrode active material may further include a binder, selectively a conductor.

The binder serves to attract negative electrode active material particles each other and to attach the negative electrode active material to a current collector. Examples of the binder are a hydrophobic binder, hydrophilic binder, or a combination thereof.

Examples of the hydrophobic binder are polyvinylchloride, carboxyl polyvinylchloride, polyvinylfluoride, polymer including ethylene oxide, polyvinylpyrrolidone, polyurethane, polytetrafluoroethylene, polyvinylidenefluoride, polyethylene, polypropylene, polyamideimide, polyimide, or a combination thereof.

Examples of the hydrophilic binder are stylenebutadiene rubber, acrylated stylenebutadiene rubber, polyvinylalcohol, sodium polyacrylate, copolymer of propylene and olefin with which the number of carbon is 2 to 8, copolymer of (meta)acryl acid and (meta)acryl acid alkylester, or a combination thereof.

When a hydrophilic binder is used as the binder, cellulos-based compounds may be included, which assign viscosity. Examples of the cellulose-based compound are carboxylmethylcellulose, hydroxypropylmethylcellulose, methylcellulose or alkali metal salt thereof. The examples are used when more than 1 of them are mixed. Examples of the alkali metal are Na, K, or Li. Usage quantity of the thickener may be 0.1 to 3 parts by weight based on 100 parts by weight of the binder.

The conductor is used for giving conductivity to an electrode, and every material can be used as long as it is an electron conductive material without chemical modification at the battery. Examples of the conductor are natural graphite, artificial graphite, carbon black, acetylene black, ketjenblack, carbon-based material such as carbon fiber;

metal powder of copper, nickel, aluminum and silver, or metal-based material such as metal fiber; conductive polymer such as polyphenylene derivatives; or a combination thereof.

Examples of the collector can be one selected from the group consisting of copper foil, nickel foil, stainless-steel foil, titanium foil, nickel foam, copper foam, polymer coated with conductive metals, or a combination thereof.

Another embodiment of the present invention provides a rechargeable lithium battery including a negative and positive electrode described before.

The positive electrode includes a collector and a positive electrode active material layer on the collector. As the positive electrode active material, a compound (lithiated intercalation compound) which makes reversible intercalation/de-intercalation of lithium can be used. To be more specific, the positive electrode active material may be at least one composite oxide formed of a metal such as cobalt, manganese, nickel, or a combination thereof and the lithium. A detailed example is a compound expressed by anyone of reactions below.

$Li_aA_{1-b}X_bD_2$(0.90≤a≤1.8, 0≤b≤0.5); $Li_aA_{1-b}X_bO_{2-c}D_c$ (0.90≤a≤1.8, 0≤b≤0.5, 0≤c≤0.05); $LiE_{1-b}X_bO_{2-c}D_c$ (0≤b≤0.5, 0≤c≤0.05); $LiE_{2-b}X_bO_{4-c}D_c$(0≤b≤0.5, 0≤c≤0.05); ≤a≤1.8, 0≤b≤0.5, 0≤c≤0.05, 0<α<2); $Li_aNi_{1-b-c}Co_b$ $X_cO_{2-\alpha}T_\alpha$(0.90≤a≤1.8, 0≤b≤0.5, 0≤c≤0.05, 0<α<2); $Li_a$ $Ni_{1-b-c}Co_bX_cO_{2-\alpha}T_2$(0.90≤a≤1.8, 0≤b≤0.5, 0≤c≤0.05, 0<α<2); $Li_aNi_{1-b-c}Mn_bX_cD_\alpha$(0.90≤a≤1.8, 0≤b≤0.5, 0≤c≤0.05, 0<α≤2); $Li_aNi_{1-b-c}Mn_bX_cO_{2-\alpha}T_\alpha$(0.90≤a≤1.8, 0≤b≤0.5, 0≤c≤0.05, 0<α<2); $Li_aNi_{1-b-c}Mn_bX_cO_{2-\alpha}T_2$ (0.90≤a≤1.8, 0≤b≤0.5, 0≤c≤0.05, 0<α<2); $Li_aNi_bE_cG_dO_2$ (0.90≤a≤1.8, 0≤b≤0.9, 0≤c≤0.5, 0.001≤d≤0.1); $Li_aNi_bCo_c$-$Mn_dG_eO_2$(0.90≤a≤1.8, 0≤b≤0.9, 0≤c≤0.5, 0≤d≤0.5, 0.001≤e≤0.1); $Li_aNiG_bO_2$(0.90≤a≤1.8, 0.001≤b≤0.1); $Li_a$-$CoG_bO_2$(0.90≤a≤1.8, 0.001≤b≤0.1); $Li_aMnG_bO_2$ (0.90≤a≤1.8, 0.001≤b≤0.1); $Li_aMn_2G_bO_4$(0.90≤a≤1.8, 0.001≤b≤0.1); $Li_aMnG_bPO_4$(0.90≤a≤1.8, 0.001≤b≤0.1); $QO_2$; $QS_2$; $LiQS_2$; $V_2O_5$; $LiV_2O_5$; $LiZO_2$; $LiNiVO_4$; $Li_{(3-f)}J_2(PO_4)_3$(0≤f≤2); $Li_{(3-f)}Fe_2(PO_4)_3$(0≤f≤2); $LiFePO_4$ In the above chemical formula, A is selected from a group of Ni, Co, Mn, and a combination; X is selected from a group of Al, Ni, Co, Mn, Cr, Fe, Mg, Sr, V, rare-earth element, and a combination thereof; D is selected from a group of O, F, S, P, and a combination thereof; E is selected from a group of Co, Mn, and a combination thereof; T is selected from a group of F, S, P, and a combination; G is selected from a group of Al, Cr, Mn, Fe, Mg, La, Ce, Sr, V, and a combination thereof; Q is selected from a group of Ti, Mo, Mn, and a combination thereof; Z is selected from a group of Cr, V, Fe, Sc, Y, and a combination thereof; J is selected from a group of V, Cr, Mn, Co, Ni, Cu, and a combination thereof.

The compound with coating layers, or a combination of the compound and another compound with coating layers may be used. The coating layer may include at least one composite selected from a group of oxide of a coating element, hydroxide, oxyhydroxide of a coating element, oxycarbonate of a coating element, and hydroxy carbonate of a coating element. A compound consisting of the coating layer may be amorphous or crystalline. Examples of the coating element included the coating layer may be Mg, Al, Co, K, Na, Ca, Si, Ti, V, Sn, Ge, Ga, B, As, Zr, or a combination thereof. Any methods are accepted so long as the positive electrode active material is not influenced wrongfully and thus the coating is applied by a method such as spray coating and dipping method. The method is well known to skilled people in the art and thus detailed description will be omitted.

The positive electrode active material includes a binder and a conductor.

The binder serves to attach the positive electrode active material particles to each other and attach the positive electrode active material to the current collector. As a typical example, polyvinyl alcohol, carboxy methyl cellulose, hydroxypropyl cellulose, diacetylcellulose, polyvinyl chloride, carboxylated polyvinyl chloride, polyvinyl fluoride, a polymer containing ethylene oxide, polyvinyl pyrrolidone, polyurethane, polytetrafluoroethylene, polyvinylidene fluoride, polyethylene, polypropylene, styrene-butadiene rubber, acrylated styrene-butadiene rubber, epoxy resin, nylon, or the like may be used, but is not limited thereto.

The conductive material is used in order to give conductivity to the electrode, and can be any material as long as the electronic conductive material does not trigger a chemical change in the battery configured according to the method. For example, the metal powder, the metal fiber, or the like such as the natural graphite, the artificial graphite, carbon black, acetylene black, ketjenblack, carbon fiber, copper, nickel, aluminum, silver, or the like may be used. In addition, a mixture of one or more conductive materials such as polyphenylene derivatives or the like may be used.

As the current collector, the aluminum (Al) may be used, but the current collector is not limited thereto.

The active material composition is prepared by mixing the active material, the conductive material, and the binder with a solvent, and each of the negative electrode and the positive electrode is prepared by applying the composition to the current collector. The method for preparing the electrode as described above is well-known to those skilled in the art. Therefore, a detailed description thereof in the specification will be omitted. As the solvent, N-methylpyrrolidone or the like may be used, but the solvent is not limited thereto.

In a non-aqueous electrolyte rechargeable battery of an exemplary embodiment of the present invention, the electrolyte can include a non-aqueous organic solvent and a lithium salt.

The non-aqueous organic solvent serves as a medium capable of moving the ions concerned in the electrochemical reaction of the battery.

A separator may be between the negative electrode and the positive electrode, depending on type of the rechargeable lithium battery. As the separator, polyethylene, polypropylene, polyvinylidene, polyfluoride, or 2 or more multilayer thereof can be used. Additionally, 2-story layer of polyethylene and polypropylene, 3-story layer of polyethylene, polypropylene and polyethylene, 3-story layer of polypropylene, polyethylene and polypropylene also can be used.

Hereinafter, examples and comparative examples of the present invention are described. However, this is only one example of the present invention and the present invention is not limited thereto.

EXAMPLE

Example 1

(Preparation of Negative Electrode Active Material)

A porous silica and an aluminum powder are dispersed by mixing using a method of dry mixing in which a weight ratio of the porous silica and the aluminum powder is 3:1 (g) to 3:2.1 (g).

After that, a heat treatment reaction is performed in a tube or box type reactor. At this time, the reaction is made at temperatures in the range of 750° C. to 950° C., and the main temperature is 800° C., 900° C. The reaction time is within 3 to 12 hours. After the reaction, aluminum oxide, porous silicon, and silica are mixed thereof.

Then, a part of the aluminum oxide is removed by transmitting the mixture stated above to a mixed solution of phosphoric acid, acetic acid, nitric acid and purified water, wherein the weight ratio of 64:5:7:24 with stirring for 6 hours at 120° C.

After the removal of some of the aluminum oxide, a silicon powder is obtained by a method of a Vacuum filtration.

After the powder obtained, a porous silicon-based negative electrode active material mixed with aluminum oxide (alumina) is prepared by drying a powder using a Vacuum oven.

(Preparation of rechargeable lithium battery)

A coin type (2016 R-Type) cell is prepared by using the compound silicon negative electrode material and a metal thin film as a positive electrode.

A coin cell battery is prepared by copolymering and compressing using a polyethylene separator having a thickness of 20 μm, and then injecting the electrolyte solution thereof. At this time, the electrolyte solution in which $LiPF_6$ at a 1.3 M concentration is dissolved in a mixed solution of ethylene carbonate (EC) and diethyl carbonate (DEC) at a mixing volume ratio of 3:7 added fluoroethylene carbonate (FEC), wherein the weight ratio of 10% are used.

Example 2

In a negative electrode active material prepared in Example 1, a magnesium powder is mixed by method of dry mixing in which a weight ratio is 1:0.5 (g) to 1:0.8 (g) to substitute a remaining silica with a silicon.

After dispersing them, a heat treatment reaction is performed in a tube or box type reactor. At this time, the reaction is made at temperatures in the range of 700° C. to 800° C., and the main temperature is 700° C., 730° C. The reaction time is within 3 to 12 hours. After the reaction, magnesium oxide, aluminum oxide (alumina), aluminum, and porous silicon are mixed thereof.

The magnesium oxide and aluminum are removed by transmitting a solution containing 2 to 5 parts by weight of a hydrochloric acid and stirring them for 4 hours at 35° C.

After the removal of the magnesium oxide and the aluminum, a silicon powder is obtained by a method of a Vacuum filtration.

After the powder obtained, it can be used as a silicon negative electrode material mixed with aluminum oxide (alumina) by drying the powder using a Vacuum oven.

In Example 2, a processing of aluminum and magnesium can be changed. In other words, aluminum reaction can be performed after magnesium reaction.

10 wt % carbon layer is coated on a porous silicon/aluminum oxide negative electrode active material by a pyrolysis of toluene gas (at 850° C., during 1 hour) through a porous silicon powder containing an aluminum oxide (5 wt %).

Comparative Example 1: Preparation of Si-Based Negative Electrode Active Material Non Containing Aluminum Oxide A porous silica and an aluminum powder are dispersed by mixing using a method of dry mixing in which the weight ratio of the porous silica and the aluminum powder is 1:0.8 (g) to 1:1 (g). After that, a heat treatment reaction is performed in a tube or box type reactor.

At this time, the reaction is made at temperatures in the range of 700° C. to 750° C., and the main temperature is 700° C., 730° C. The reaction time is within 3 to 12 hours. After the reaction, magnesium oxide and porous silicon are mixed thereof.

The magnesium oxide formed after the heat treatment processing can be removed in the manner described above.

After the removal of the magnesium oxide, a silicon powder is obtained by a method of a Vacuum filtration. After the powder obtained, a negative electrode active material is prepared by drying a powder using a Vacuum oven.

Comparative Example 2: Preparation of General Si-Based Negative Electrode Active Material A rechargeable lithium battery is prepared in the same manner as in Example 1 except for using a silicon powder (325 mesh, average particle size=40 micrometers) purchased from Aldrich.

Experimental Example 1: Scanning Electron Microscope (SEM) Analysis

FIGS. 2(a) and 2(b) are SEM images of the porous silica before a reaction used in Example 1 and 2.

FIGS. 2(c) and 2(d) are SEM images of the negative electrode active material mixed alumina and silicon prepared in Example 1.

FIGS. 2(e) and 2(f) are SEM images of the negative electrode active material prepared in Example 2.

Figure 2:
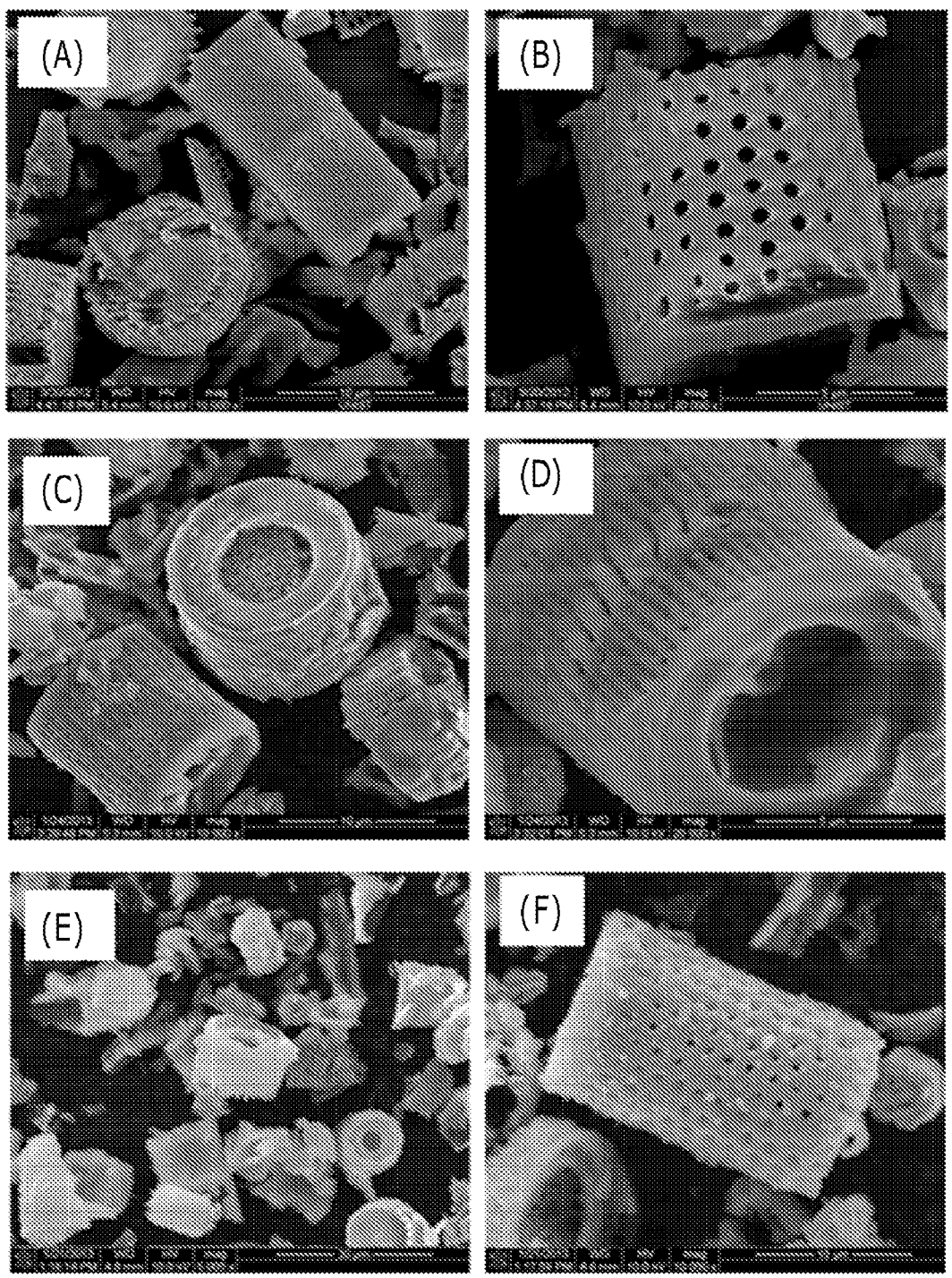
FIG. 2 is a step-by-step scanning electron microscope (SEM) image of the porous silicon including the porous silica and the metal oxide described at Example 1 and Example 2.

As in FIG. 2, it can be seen that the porous structure is maintained under the process of a preparing a negative electrode active material from a raw material.

Experimental Example 2: X-Ray Diffraction (XRD) Analysis

Figure 3:
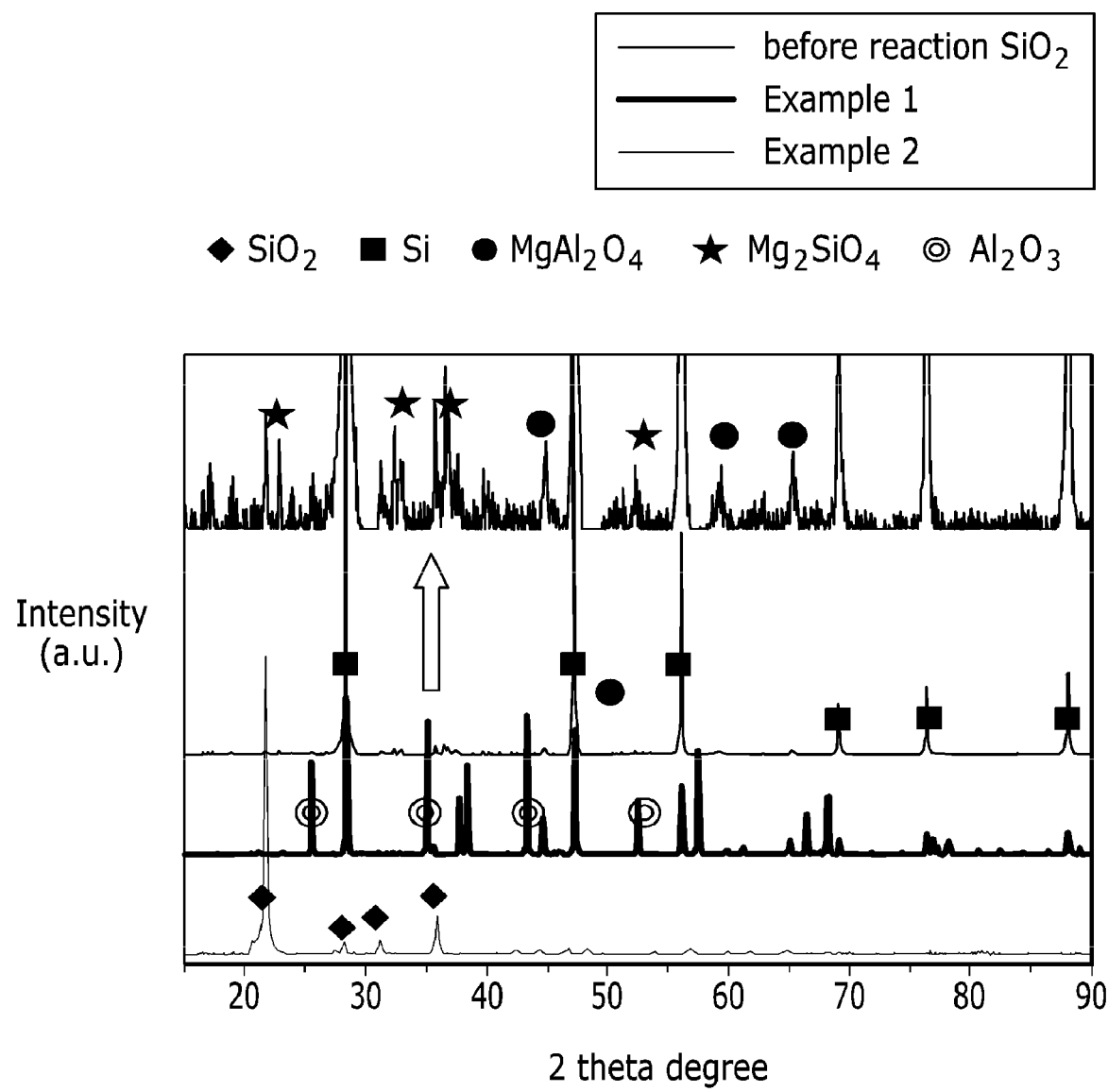
FIG. 3 is analysis data of X-ray diffraction (XRD) of the negative active material described at Example 1 and Example 2.
Figure 4:
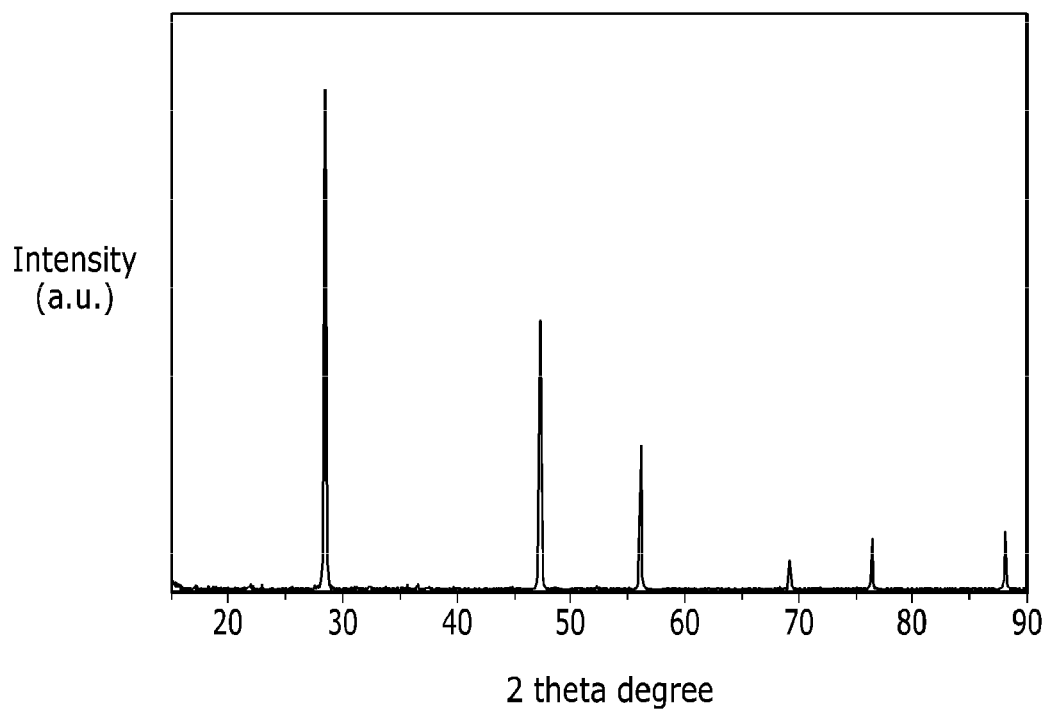
FIG. 4 is analysis data of X-ray diffraction (XRD) of the negative active material at Comparative Example 1.

FIG. 3 is a XRD data of the electrode active material under Example 1 and 2, and FIG. 4 is a XRD date of the electrode active material under Comparative Example 1.

XRD was measured using a Rigaku D/MAX and a CuKα source at 4000V.

In case of Example 1, Si, $Al_2O_3$, etc. are contained within the negative electrode active material. In case of Example 2, Si, $MgAl_2O_4$, $Mg_2SiO_4$ are contained within the negative electrode active material. In other words, finally, it can be seen that it was reduced to a silicon material containing a small amount of a metallic oxide.

Experimental Example 3: EDAX Elemental Analysis

Figure 5A:
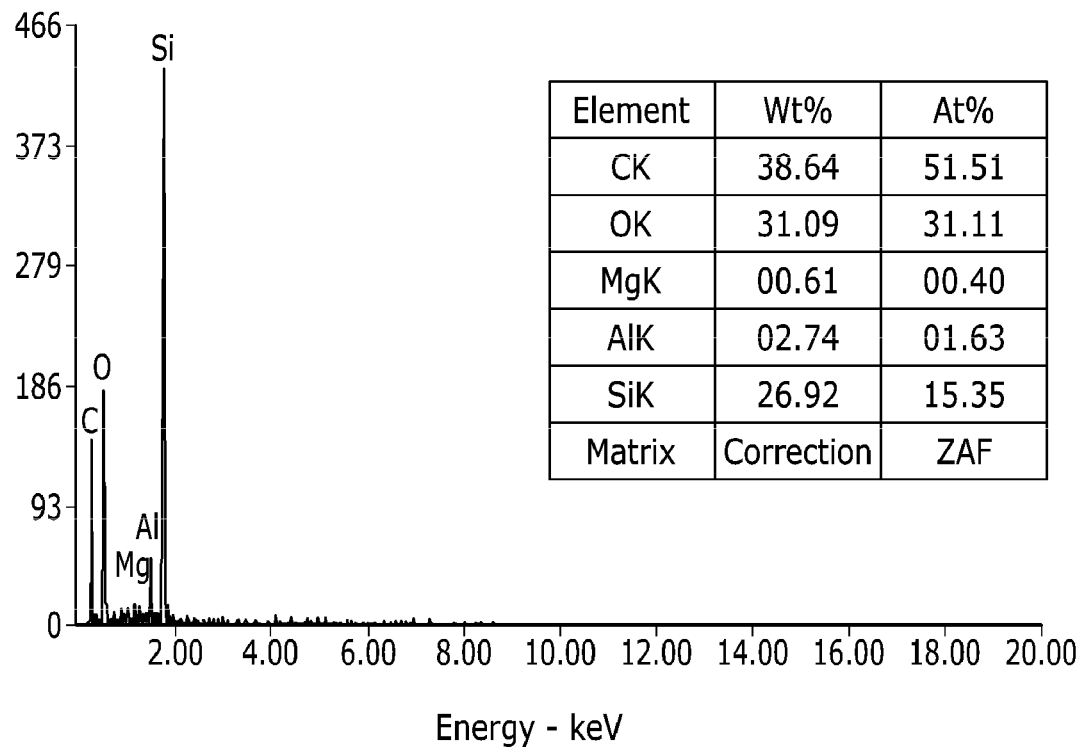
FIGS. 5a and 5b are EDAX data which describes quantitative numericals of the metal oxide at Example 2.
Figure 5B:
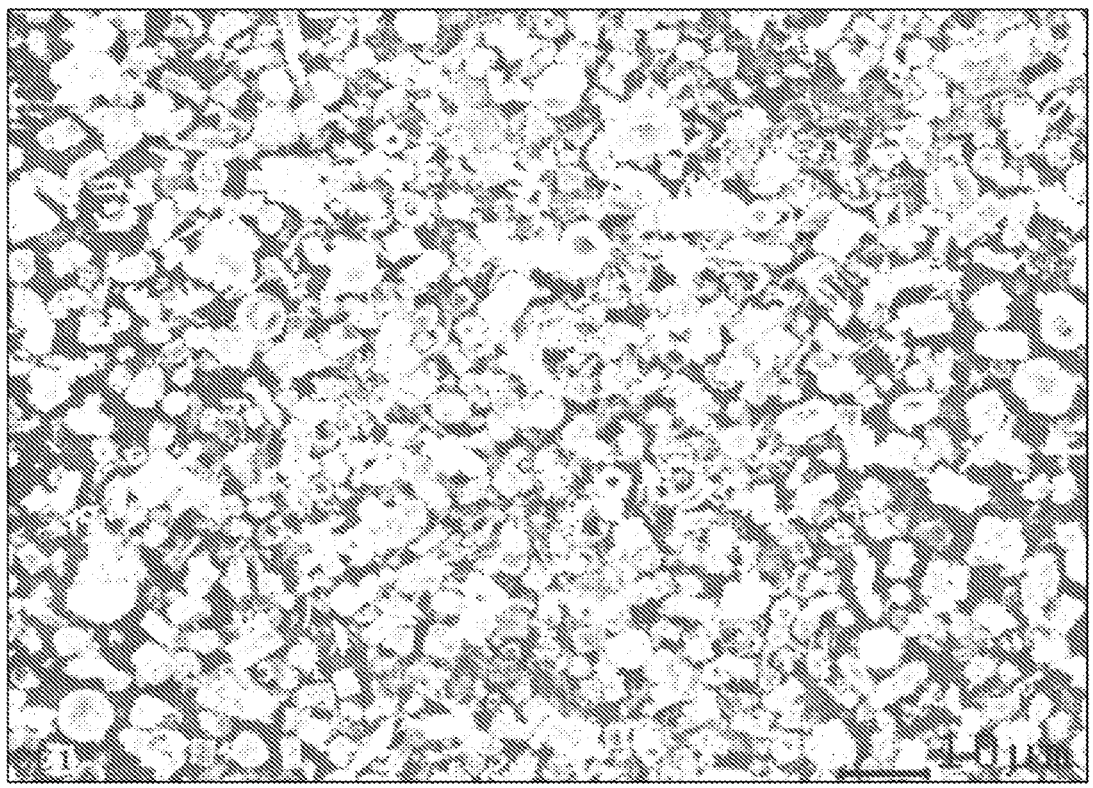
Figure 6A:
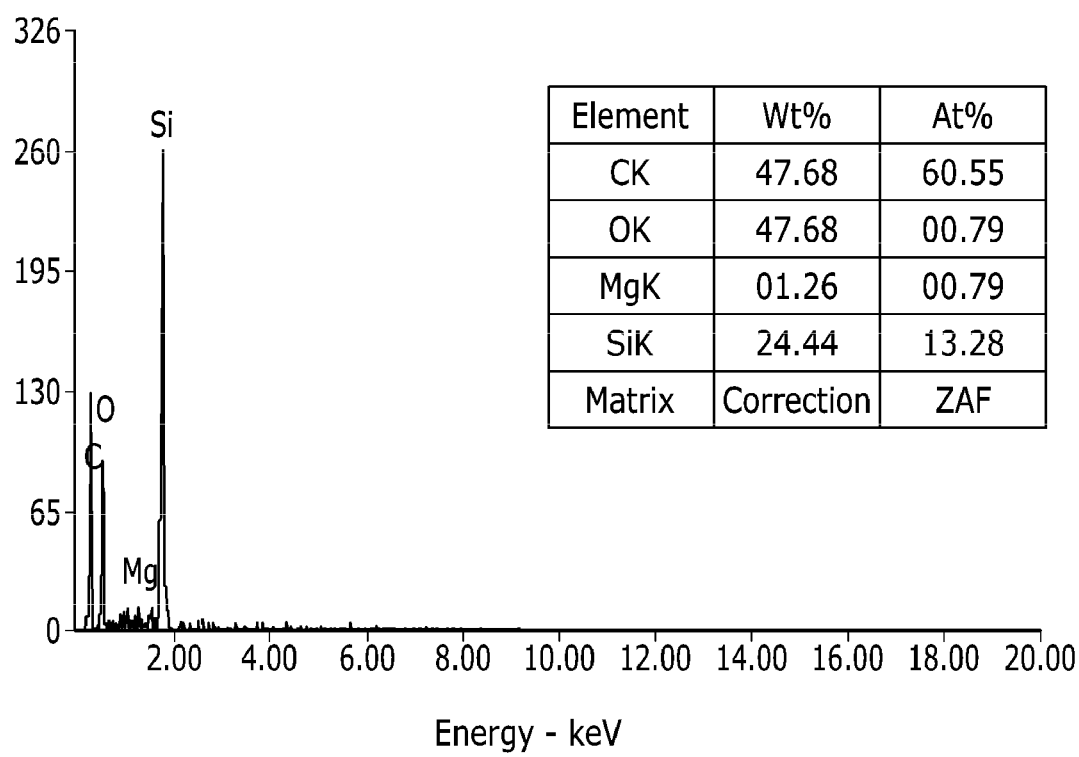
FIGS. 6a and 6b are EDAX data which describes quantitative numericals of the metal oxide at Comparative Example 1.
Figure 6B:
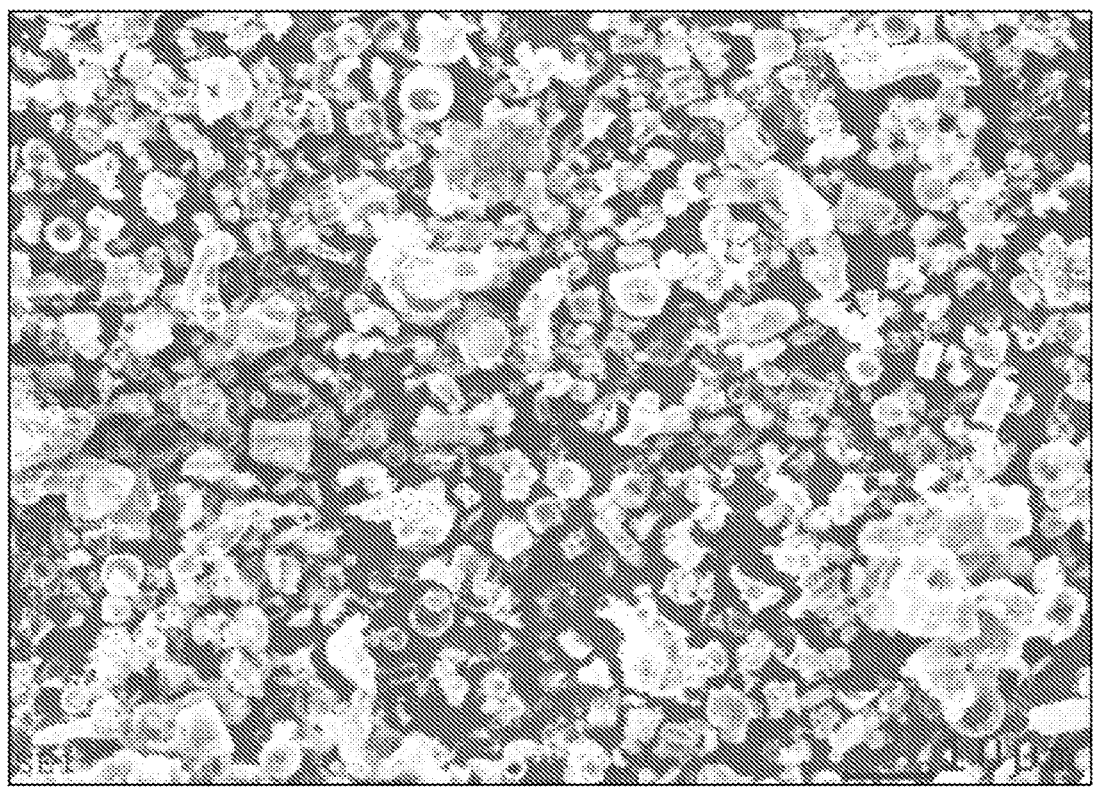

FIGS. 5a and 5b are results of the EDAX (Energy Dispersive x-ray Spectroscopy) elemental analysis of the negative electrode active material under Example 2, and FIGS. 6a and 6b are results of the EDAX elemental analysis of the negative electrode active material under Comparative Example 1.

The contents of the element contained in the negative electrode active material under Example 2 may be confirmed through FIG. 5.

Experimental Example 5: Comparison of Characteristics of the Coin Cell

Figure 7:
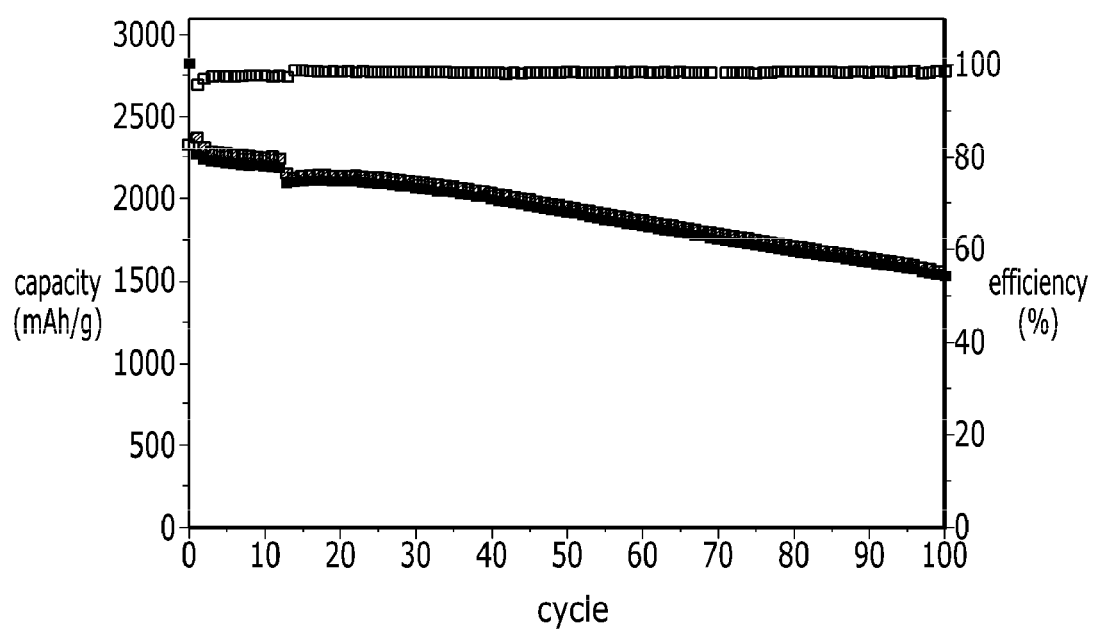
FIG. 7 is a graph describing the cycle characteristics of the coin cell at Example 2.
Figure 8:
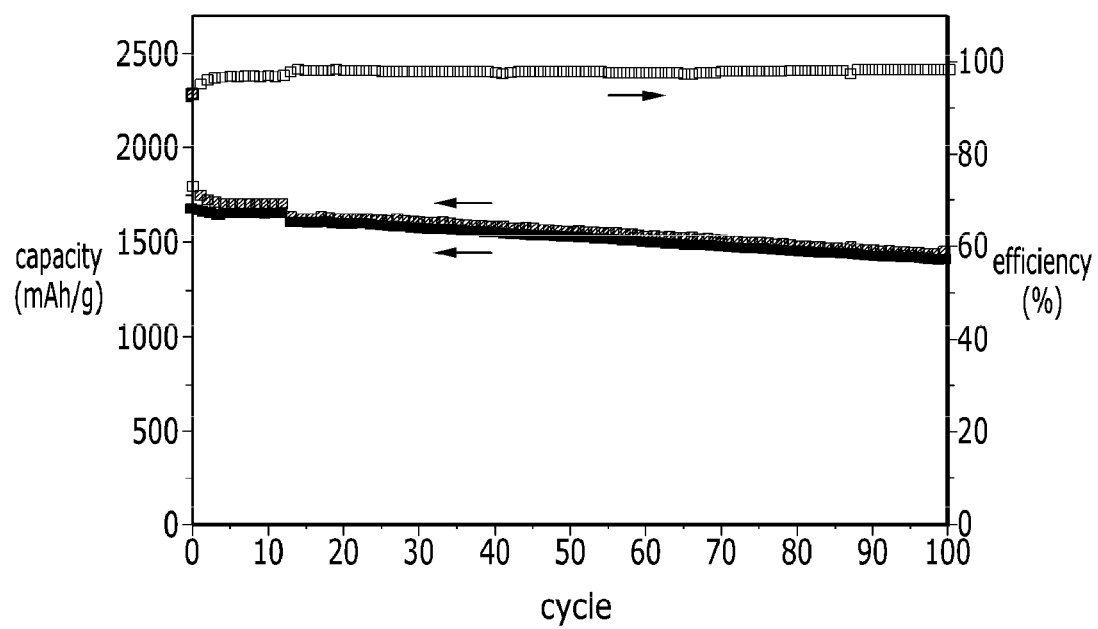
FIG. 8 is a graph describing the cycle characteristics of the coin cell at Comparative Example 1.
Figure 9:
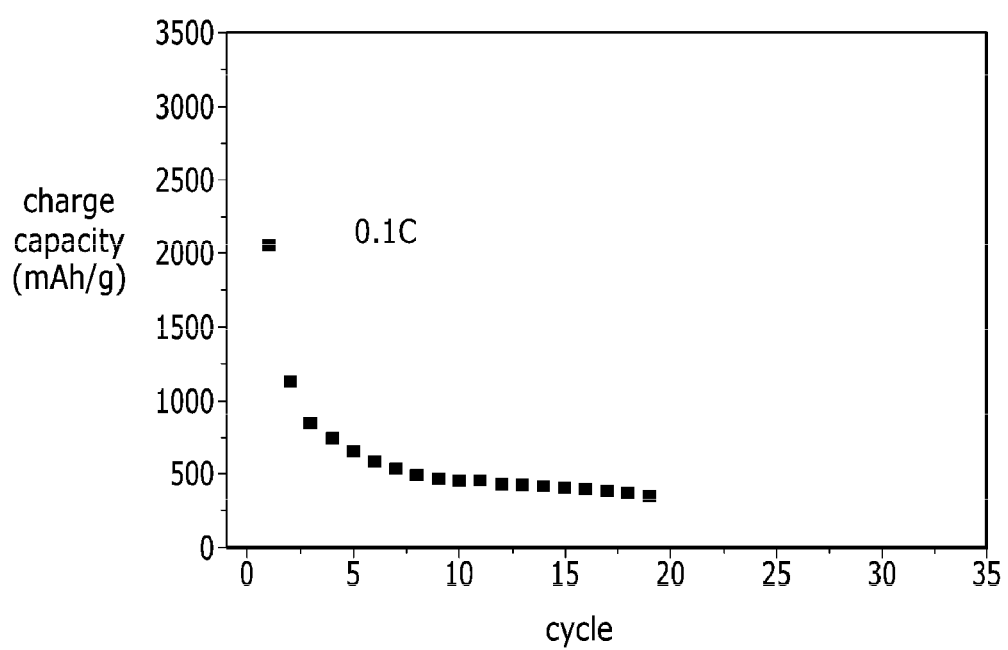
FIG. 9 is a graph describing the cycle characteristics of the coin cell at Comparative Example 2.

FIG. 7 is a graph representing cycle characteristic of the coin cell according to Example 2, FIG. 8 is a graph representing cycle characteristic of the coin cell according to Comparative Example 1, and FIG. 9 is a graph showing cycle characteristic of the coin cell according to Comparative Example 2.

In FIGS. 7 and 8, the graph located at the top indicates the coulombic efficiency of the right vertical axis, and the following two graphs are graphs showing charge and discharge capacity of the left vertical axis.

As shown Comparative Example 2 in FIG. 9, in case of silicon powder, it can be seen that the capacity falls to 500 mAh/g after 5 cycles at 0.1 C rate. In addition, Comparative Example 1 in FIG. 8 maintains its capacity about 65% compared to that of initial.

On the contrary, Example 2 in FIG. 7 realizes a capacity 1750 mAh/g under a first cycle at 0.1 C rate, and after under 100 cycle at 0.2 C rate it realizes a reversible capacity whose capacity about 1500 mAh/g or more. Thus, it indicates a high capacity retention rate that is higher than about 85% that of initial.

The present invention is not limited to the exemplary embodiments, but may be implemented in various different forms. It may be understood by those skilled in the art to which the present invention pertains that the present invention may be implemented with other specific forms without changing the spirit or essential features thereof. Therefore, it should be understood that the above-mentioned embodiments are not restrictive but are exemplary in all aspects.

What is claimed is:

1. A method of preparing a porous silicon-based negative electrode active material, comprising:
   mixing a porous silica ($SiO_2$) with a first metal powder;
   oxidizing all or part of the first metal powder to a first metal oxide as soon as reducing a part of the porous silica as a porous silicon (Si) by heat-treating a mixture of the porous silica with the first metal power;
   obtaining a first porous silicon-based material including the porous silicon and the first metal oxide;
   mixing a second metal powder which is different from the first metal powder with the obtained first porous silicon-based material;
   oxidizing all or part of the second metal powder to a second metal oxide as soon as reducing a remaining porous silica to a porous silicon by heat-treating a mixture of the second metal powder with the first porous silicon-based material; and
   obtaining a second porous silicon-based material including the porous silicon, the first metal oxide, and the second metal oxide,
   wherein heat-treating the mixture of the porous silica with the first metal powder is performed at a first temperature of 650° C. to 950° C.,
   heat-treating the mixture of the second metal powder and the first porous silicon-based material is performed at a second temperature of 650° C. to 950° C.,
   the first temperature is higher than a melting point of the first metal powder, and
   the second temperature is higher than a melting point of the second metal powder.

2. The method of claim 1, wherein
the porous silica is obtained from a diatomite.

3. The method of claim 1, wherein
an average particle size of the porous silica is 100 nm to 50 μm.

4. The method of claim 1, wherein
an average pore size of a pore of the porous silica is 20 nm to 1 μm.

5. The method of claim 1, wherein
the first metal powder and the second metal powder are different from each other, and each independently represents aluminum, magnesium, calcium, aluminum silicide (AlSi2), magnesium silicide (Mg2Si), calcium silicide (Ca2Si) or a combination thereof.

6. The method of claim 1, wherein
anyone of the first metal powder and the second metal powder is aluminum.

7. The method of claim 1, wherein
average particle sizes of the first metal powder and the second metal powder each independently represents 1 to 100 μm.

8. The method of claim 1, wherein
the first metal powder is made by adding 25 to 70 weight parts against 100 weight parts of the porous silica.

9. The method of claim 1, wherein
the first metal powder is made by adding 50 to 80 weight parts against 100 weight parts of the first porous silicon-based material.

10. The method of claim 1, wherein
the mixing a porous silica with the first metal powder, or
the mixing the second metal powder with the first porous silicon-based material is adding a mineral additive.

11. The method of claim 10, wherein
the mineral additive is sodium chloride (NaCl), potassium chloride (KCl), calcium chloride (CaCl2)), magnesium chloride (MgCl2) or a combination thereof.

12. The method of claim 1, wherein,
the mixing a porous silica with the first metal powder, or
the mixing the second metal powder with the first porous silicon-based material is performed by a method for dry mixing.

13. The method of claim 1, wherein
the first metal oxide and the second metal oxide are different from each other, and each independently represents MgO, CaO, Al2O3, TiO2, Fe2O3, Fe3O4, Co3O4, NiO, SiO2 or a combination thereof.

14. The method of claim 1, wherein
in the second porous silicon-based material, each of the content of the first metal oxide and the second metal oxide independently represents 1 to 20 weight parts against 100 weight parts of the porous silicon.

15. The method of claim 1, wherein,
the obtained second porous silicon-based material is a form evenly mixed with the porous silicon, the first metal oxide, and the second metal oxide.

16. The method of claim 1, wherein,
the obtained second porous silicon-based material includes an alloy of the first metal oxide and the second metal oxide.

17. The method of claim 1, wherein,
after the heat-treating a mixture of the porous silica with the first metal powder,
further includes removing all or part of the first metal oxide.

18. The method of claim 17, wherein
the removing all or part of the first metal oxide
is performed by using a solution including hydrochloric acid, phosphoric acid, hydrofluoric acid, sulfuric acid, nitric acid, acetic acid, ammonia water, hydrogen peroxide, or a combination thereof.

19. The method of claim 1, wherein,
after the heat-treating a mixture of the second metal powder with the first porous silicon-based material,
further includes removing all or part of the second metal oxide.

20. The method of claim 19, wherein
the removing all or part of the second metal oxide
is performed by using a solution including hydrochloric acid, phosphoric acid, hydrofluoric acid, sulfuric acid, nitric acid, acetic acid, ammonia water, hydrogen peroxide, or a combination thereof.

21. The method of claim 1, wherein,
after the obtaining the second porous silicon-based material,
further includes carbon coating.

* * * * *